US012505249B2

(12) United States Patent
Arora et al.

(10) Patent No.: US 12,505,249 B2
(45) Date of Patent: Dec. 23, 2025

(54) SYSTEM AND METHOD FOR SECURING USER DATA AGAINST INTERNAL CYBER THREATS (71) Applicant: Bank of America Corporation, Charlotte, NC (US)

(72) Inventors: Saurabh Arora, Gurugram (IN); Sandeep Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/643,637

(22) Filed: Apr. 23, 2024

(65) Prior Publication Data
US 2025/0328679 A1    Oct. 23, 2025

(51) Int. Cl.
G06F 21/62    (2013.01)
G06F 21/31    (2013.01)

(52) U.S. Cl.
CPC ........ *G06F 21/6245* (2013.01); *G06F 21/316* (2013.01); *G06F 2221/2141* (2013.01)

(58) Field of Classification Search
CPC .............. G06F 21/6245; G06F 21/316; G06F 2221/2141
USPC ......................................................... 726/26
See application file for complete search history.

(56) References Cited

U.S. PATENT DOCUMENTS

| | | |
|---|---|---|
| 9,609,010 B2 | 3/2017 | Sipple |
| 9,703,952 B2 | 7/2017 | Almehmadi et al. |
| 10,003,608 B2 | 6/2018 | Treat et al. |
| 10,178,116 B2 | 1/2019 | Fujisawa et al. |
| 10,205,735 B2 | 2/2019 | Apostolopoulos |
| 10,318,729 B2 | 6/2019 | Ford et al. |
| 10,412,108 B2 | 9/2019 | LaRosa et al. |
| 10,601,939 B2 | 3/2020 | Agarwal et al. |
| 11,055,417 B2 | 7/2021 | Bhatia et al. |
| 11,132,441 B2 | 9/2021 | Denney et al. |
| 11,470,096 B2 | 10/2022 | Muddu et al. |
| 11,637,844 B2 | 4/2023 | Shenoy et al. |
| 11,693,964 B2 | 7/2023 | Stockdale et al. |
| 11,734,148 B2 | 8/2023 | Biswas et al. |
| 11,838,298 B2 | 12/2023 | Cunningham et al. |
| 11,843,628 B2 | 12/2023 | Fellows et al. |
| 11,876,821 B1 | 1/2024 | Pratt et al. |
| 2016/0174072 A1* | 6/2016 | Allyn ..................... H04L 51/58 455/411 |

(Continued)

*Primary Examiner* — Zi Ye (57) ABSTRACT

A system includes a memory configured to store user profile data associated with a user, user interaction data associated with a preauthorized user, and a software application configured to access the user profile data. The system further includes processors configured to access the user interaction data, in which the user interaction data is captured in relation to a natural language exchange session. The processors execute a generative machine-learning model trained to identify an intent of the preauthorized user based on the user interaction data associated with the preauthorized user, determine, based on the identified intent, whether the user interaction data corresponds to a sequence of authorized user interactions or a sequence of unauthorized user interactions, and, in response to determining that the user interaction data corresponds to the sequence of unauthorized user interactions, cause the software application to restrict access of the preauthorized user to the user profile data.

20 Claims, 3 Drawing Sheets (56) References Cited

U.S. PATENT DOCUMENTS

| | | | |
|---|---|---|---|
| 2017/0244718 A1* | 8/2017 | Andreeva | H04L 63/08 |
| 2020/0184052 A1* | 6/2020 | Ellison | G06F 21/36 |
| 2022/0174097 A1 | 6/2022 | Biswas et al. | |
| 2023/0224316 A1 | 7/2023 | Rajasekharan et al. | |

* cited by examiner

SYSTEM AND METHOD FOR SECURING USER DATA AGAINST INTERNAL CYBER THREATS

TECHNICAL FIELD

The present disclosure relates generally to computing security, and, more specifically, to a system and method for securing user data against internal cyber threats.

BACKGROUND

Certain web-based environments may include data stored across any number of databases and associated with any number of entities. For example, the data may include various user data or service data that may be stored to databases associated with respective entities, and that user data or service data may be accessed by any number of centralized or decentralized servers for servicing applications associated with various users. However, such web-based environments may be sometimes subjected to various insider threats and insider cyberattacks.

SUMMARY

The system and methods implemented by the system as disclosed in the present disclosure provide technical solutions to the technical problems discussed above by providing systems and methods for securing user data against internal cyber threats. The disclosed system and methods provide several practical applications and technical advantages. Specifically, the present embodiments improve the security, reliability, and maintainability of software applications, systems, and sensitive user data, as well as the one or more processors and memory on which the software applications, systems, and sensitive user data may be executed and stored by providing an insider threat detection system that utilizes one or more generative artificial intelligence (AI) models to identify an internal user intent based on a real-time or near real-time natural language exchange between the internal user and an external user to which the sensitive user data belongs, and further to determine whether to allow or restrict further access of the internal user to the sensitive user data based on whether one or more subsequent user interactions performed by the internal user corresponds to one or more authorized and valid user interactions in accordance with the intent.

Thus, the present embodiments may identify, isolate, and preempt potential insider threats, insider adversarial attacks, cyberattacks, data breaches, or other security vulnerabilities that may be associated with software applications, systems, and sensitive user data. Specifically, by determining in real-time or near real-time the intent of the internal user and then monitoring the subsequent user interactions of the internal user in accordance with the determined intent to determine whether to allow or restrict further access of the internal user to sensitive user data, the present embodiments may identify in real-time or near real-time insider threats and actively reconfigure the software application, system, or sensitive user data to which the internal user previously had access to prevent a potential data leak or other systemic vulnerability with respect to the software application, system, or sensitive user data.

The present embodiments are directed to systems and methods for securing user data against internal cyber threats. In particular embodiments, a memory may be configured to store user profile data associated with at least one user of a plurality of users, user interaction data associated with a preauthorized user, and a software application configured to access the user profile data. For example, in one embodiment, the preauthorized user may be preauthorized to access the user profile data utilizing the software application. In particular embodiments, one or more processors operably coupled to the memory and may be configured to access the user interaction data associated with the preauthorized user.

In one embodiment, the user interaction data may be captured in relation to a natural language exchange session regarding the user profile data. In one embodiment, the natural language exchange session may be conducted electronically between the preauthorized user and the at least one user. In particular embodiments, the user interaction data may be captured in relation to a live natural language exchange session conducted electronically between the preauthorized user and the at least one user. In particular embodiments, the one or more processors may then execute one or more generative machine-learning models trained to identify an intent of the preauthorized user based at least in part on the user interaction data associated with the preauthorized user.

For example, in one embodiment, the one or more generative machine-learning model may include one or more of a language model (LM), a large language model (LLM), a bidirectional and auto-regressive transformer (BART) model, a bidirectional encoder representation for transformer (BERT) model, a knowledge enhanced bidirectional encoder representations for transformer (KnowBERT) model, or a generative pre-trained transformer (GPT) model. In particular embodiments, the one or more processors may execute the one or more generative machine-learning models further trained to identify the intent of the preauthorized user based at least in part on a data set of recent user calls, a data set of historical user requests, and one or more unresolved user queries associated with the user profile data.

In particular embodiments, the one or more processors may execute the one or more generative machine-learning models further trained to identify the intent of the preauthorized user by determining whether the user interaction data corresponds to one or more predicted search queries executed in accordance with the natural language exchange session. In particular embodiments, the one or more processors may then determine, based on the identified intent of the preauthorized user, whether the user interaction data corresponds to one or more of a sequence of authorized user interactions or one or more of a sequence of unauthorized user interactions.

For example, in particular embodiments, the one or more processors may then determine that the user interaction data corresponds to one or more of the sequences of authorized user interactions based on an identified context associated with the natural language exchange session. In particular embodiments, the one or more processors may then determine that the user interaction data corresponds to one or more of the sequences of authorized user interactions based on an identified temporal attention associated with the natural language exchange session. In particular embodiments, the one or more processors may then, in response to determining that the user interaction data corresponds to one or more of the sequences of unauthorized user interactions, cause the software application to restrict further access of the preauthorized user to the user profile data.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
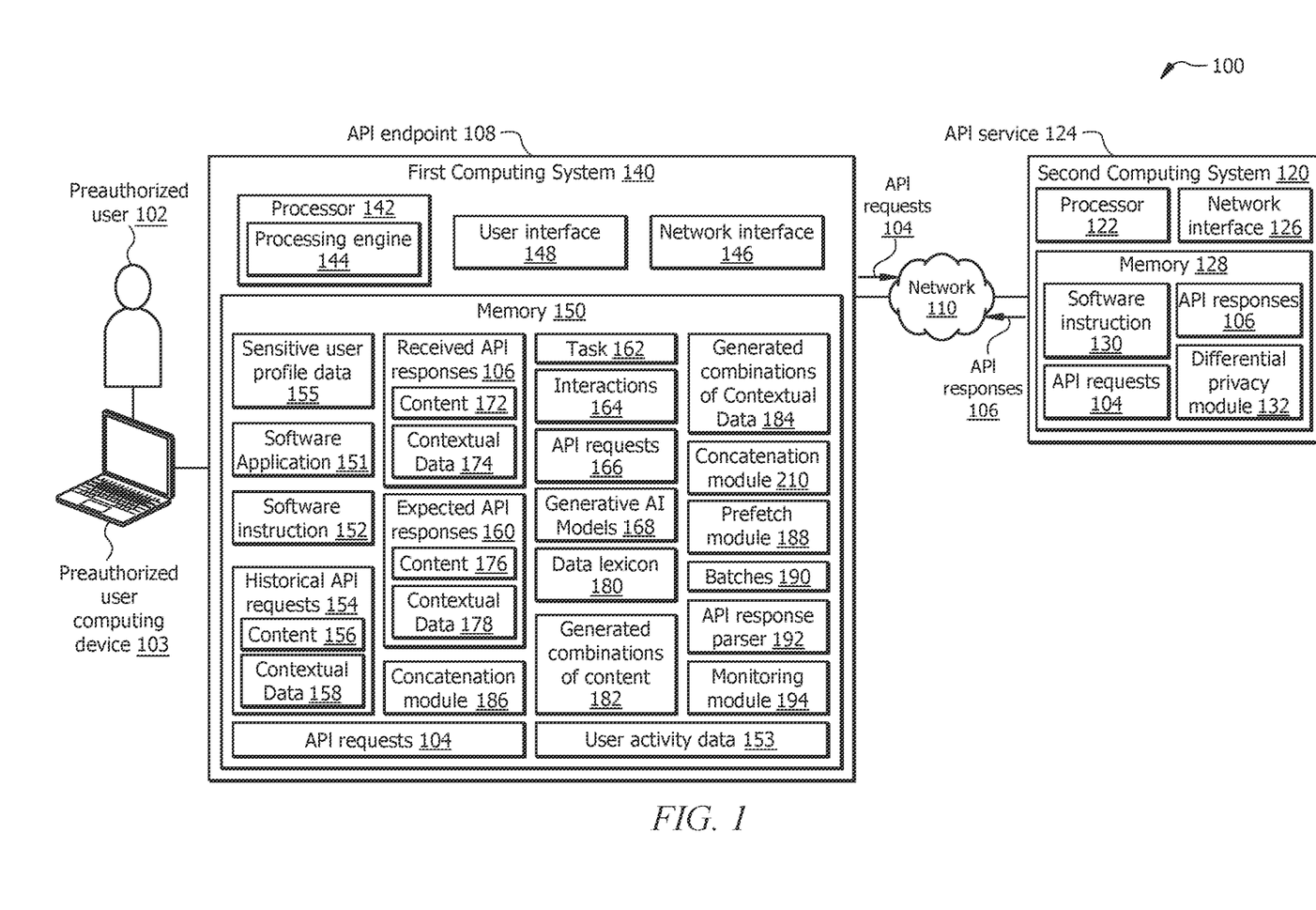
FIG. 1 is a block diagram of a system of a server and host computing system and network, in accordance with certain aspects of the present disclosure.

FIG. 1 is a block diagram of a computing system and network 100 that is configured to detect potentially adversarial insider interactions 164 made with respect to API services 124, API responses 106, and/or the software application 151 and log the detected potentially adversarial insider interactions 164 made with respect to API services 124, API responses 106, and/or the software application 151. In one embodiment, the computing system and network 100 may include a first computing system 140. In some embodiments, the computing system and network 100 further may include a preauthorized user 102, a preauthorized user computing device 103, a network 110 and a second computing system 120.

In particular embodiments, the preauthorized user 102 may include any user associated with an institution, an organization, or an entity that has been granted preauthorization to access for servicing purposes the sensitive user profile data 155. The sensitive user profile data 155 that may be associated with one or more of a large number of users external to the institution, the organization, or the entity. The network 110 enables communications among components of the computing system and network 100. In other embodiments, the computing system and network 100 may not have all of the components listed and/or may have other elements instead of, or in addition to, those listed above.

In particular embodiments, the first computing system 140 may include a processor 142 in signal communication with a memory 150. The memory 150 stores software instructions 152 that when executed by the processor 142, cause the processor 142 to perform one or more functions described herein. For example, when the software instructions 152 are executed, the processor 142 executes a processing engine 144 to access the user interaction data associated with the preauthorized user 102, in which the user interaction data is captured in relation to a natural language exchange session regarding the sensitive user profile data 155.

The processor 142 further executes one or more generative machine-learning models 168 trained to identify an intent of the preauthorized user 102 based at least in part on the user interaction data associated with the preauthorized user 102, and further determine, based on the identified intent of the preauthorized user 102, whether the user interaction data corresponds to one or more of a sequence of authorized user interactions or one or more of a sequence of unauthorized user interactions. In response to determining that the user interaction data corresponds to one or more of the sequences of unauthorized user interactions, the processor 142 causes the software application 151 to restrict further access of the preauthorized user 102 to the sensitive user profile data 155.

The computing system and network 100 may be configured as shown, or in any other configuration. In accordance with the presently disclosed embodiments, the first computing system 140 may be suitable for securing user data against internal cyber threats associated with the preauthorized user 102. In one embodiment, the first computing system 140 may include a centralized or decentralized server of an institution or organization suitable for hosting and servicing a large number of external users, as well as internal users, such as the preauthorized user 102 while utilizing the preauthorized user computing device 103. Similarly, the second computing system 120 may include third-party server or service that may be communicatively coupled to the first computing system 140 by way of the network 110.

System Components

Network

The network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Second Computing System

In particular embodiments, the second computing system 120 is generally a computing device that is configured to process data and communicate with computing devices (e.g., the first computing system 140), databases, systems, etc., via the network 110 and may be associated with a second entity separate from the first entity in accordance with the presently disclosed embodiments. The second computing system 120 is generally configured to generate API responses 106 in response to receiving the API requests 104 and/or API requests 166. In particular embodiments, the second computing system 120 may include a processor 122 in signal communication with a network interface 126 and a memory 128. Memory 128 stores software instructions 130 that when executed by the processor 122, cause the second computing system 120 to perform one or more functions described herein. For example, when the software instructions 130 are executed, the second computing system 120 generates API responses 106 in response to receiving the API requests 104. The second computing system 120 may be configured as shown, or in any other configuration.

The processor 122 may include one or more processors operably coupled to the memory 128. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The processor 122 is communicatively coupled to and in signal communication with the network interface 126 and memory 128. The one or more processors are configured to process data and may be implemented in hardware or software.

For example, the processor 122 may be 8-bit, 16-bit, 32-bit, 64-bit, or of any other suitable architecture. The processor 122 may include an arithmetic logic unit (ALU)

for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 130 to implement the functions disclosed herein, such as some or all of those described with respect to FIGS. 1-2. In some embodiments, the function described herein is implemented using logic units, FPGAs, ASICs, DSPs, or any other suitable hardware or electronic circuitry.

The network interface 126 is configured to enable wired and/or wireless communications (e.g., via the network 110). The network interface 126 is configured to communicate data between the second computing system 120 and other network devices, systems, or domain(s). For example, the network interface 126 may comprise a WIFI interface, a local area network (LAN) interface, a wide area network (WAN) interface, a modem, a switch, or a router. The processor 122 is configured to send and receive data using the network interface 126. The network interface 126 may be configured to use any suitable type of communication protocol.

The memory 128 may be volatile or non-volatile and may comprise a read-only memory (ROM), random-access memory (RAM), ternary content-addressable memory (TCAM), dynamic random-access memory (DRAM), and static random-access memory (SRAM), or other non-transitory computer-readable medium. Memory 128 may be implemented using one or more disks, tape drives, solid-state drives, and/or the like. Memory 128 is operable to store the software instructions 130, API requests 104, API responses 106, differential privacy module 132, and/or any other data or instructions. The software instructions 130 may comprise any suitable set of instructions, logic, rules, or code operable to execute the processor 122.

The memory 128 may also store a second user data set 131 that may be associated with the second entity to which the second computing system 120 is associated. For example, in some embodiments, the second entity may include a second user profile configured to facilitate user interactions between the preauthorized user 102 and a number of other users associated with the second entity, and thus the second user data set 131 may include any data associated with the preauthorized user 102 and servicing and facilitating user interactions between the preauthorized user 102 and a number of other users associated with the second entity and the second computing system 120.

First Computing System

In particular embodiments, the first computing system 140 is generally any computing device that is configured to process data and communicate with computing devices (e.g., second computing system 120), databases, systems, etc., via the network 110. The first computing system 140 is generally configured to oversee operations of the processing engine 144. The first computing system 140 is associated with an API endpoint 108 where API requests 104 are originated. In particular embodiments, the first computing system 140 may include the processor 142 in signal communication with a network interface 146, a user interface 148, and memory 150. The first computing system 140 may be configured as shown, or in any other configuration.

The processor 142 may include one or more processors operably coupled to the memory 150. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 142 may be a programmable logic device, a microcontroller, a microprocessor, or any suitable combination of the preceding. The processor 142 is communicatively coupled to and in signal communication with the network interface 146, user interface 148, and memory 150. The one or more processors are configured to process data and may be implemented in hardware or software.

For example, the processor 142 may be 8-bit, 16-bit, 32-bit, 64-bit or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 152 to implement the functions disclosed herein, such as some or all of those described with respect to FIGS. 1-2. In some embodiments, the function described herein is implemented using logic units, FPGAs, ASICs, DSPs, or any other suitable hardware or electronic circuitry.

The network interface 146 is configured to enable wired and/or wireless communications (e.g., via the network 110). The network interface 146 is configured to communicate data between the first computing system 140 and other network devices, systems, or domain(s). For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol.

The memory 150 may be volatile or non-volatile and may include a read-only memory (ROM), random-access memory (RAM), ternary content-addressable memory (TCAM), dynamic random-access memory (DRAM), and static random-access memory (SRAM). Memory 150 may be implemented using one or more disks, tape drives, solid-state drives, and/or the like. Memory 150 is operable to store the software instructions 152, historical API requests 154, API requests 104, concatenation module 186, prefetch module 188, received PAI responses 106, expected API responses 160, generated combinations of content 182, generated combination of contextual data 184, API requests 166, generative machine-learning models 168, task 162, interactions 164, data lexicon 180, batches 190, API response parser 192, monitoring module 194, and/or any other data or instructions. The software instructions 152 may include any suitable set of instructions, logic, rules, or code operable to execute the processor 142.

The memory 150 may also store instances of a software application 151 that may be executing within the computing system and network 100. In one embodiment, the instances of a software application 151 may include any number of instances a large software application suitable for hosting and servicing millions or billions of individual users and that may also interact via API requests 104 and API responses 106 with the computing system 120.

Processing Engine

Processing engine 144 may be implemented by the processor 142 executing the software instructions 152, and is generally configured to access the user interaction data associated with the preauthorized user 102, in which the user interaction data is captured in relation to a natural language exchange session regarding the sensitive user profile data 155. The processor 142 further executes one or more generative machine-learning models 168 trained to identify an intent of the preauthorized user 102 based at least in part on the user interaction data associated with the preauthorized user 102, and further determine, based on the identified intent of the preauthorized user 102, whether the user interaction data corresponds to one or more of a sequence of authorized user interactions or one or more of a sequence of unauthorized user interactions. In response to determining that the user interaction data corresponds to one or more of the sequences of unauthorized user interactions, the processor 142 causes the software application 151 to restrict further access of the preauthorized user 102 to the sensitive user profile data 155.

The processing engine 144 accesses historical API requests 154. The processing engine 144 generates one or more API requests 104 based on content 156 and contextual data 158 associated with the historical API requests 154. The processing engine 144 sends the API requests 104 to the second computing system 120. The second computing system 120 generates API responses 106 to the received API requests 104. The second computing system 120 sends the API responses 106 to the first computing system 140.

The processing engine 144 parses the API responses 106 and detects content 172 and contextual data 174 associated with the API responses 106. The processing engine 144 compares each received API response 106 with a counterpart expected API response 160, where each received API response 106 and the counterpart expected API response 160 is associated with the same API request 104 and/or task 162, such as generating a user account number.

The processing engine 144 determines whether a received API response 106 corresponds with its counterpart expected API response 160. If the processing engine 144 determines that the received API response 106 does not correspond with the counterpart expected API response 160, the processing engine 144 identifies the difference between the received API response 106 and the counterpart expected API response 160. In other words, the processing engine 144 identifies interactions 164 made to the received API response 106, where the interactions 164 is made to the received API response 106 by the second computing system 120. In response, the processing engine 144 may update future API requests 166 associated with the particular task 162 according to the interactions 164 made to the received API response 106.

Generating Combinations of Content and Contextual Data

The operational flow may begin at an adversarial training generation step where the processing engine 144 accesses the historical API requests 154, e.g., stored in the memory 150.

Each historical API request 154 may include content 156 and contextual data 158. For example, the content 156 associated with a historical API request 154 may include the data that is requested in the historical API request 154. In an example historical API request 154 that requests to generate a user account number for a user, the content 156 may include a name, a unique identifier number, phone number, address, user account number, and/or the like. The contextual data 158 associated with a historical API request 154 may include one or more a header, a trailer, an URL, a data format associated with the content 156, and/or the like.

The processing engine 144 identifies the content 156 and the contextual data 158 associated with the historical API requests 154. The processing engine 144 uses this information to generate the API requests 104. One reason for generating API requests 104 is to generate different combinations or different possibilities of content 182 and contextual data 184. Each combination of content 182 and contextual data 184 corresponds to one API request 104. In this manner, the processing engine 144 is able to detect any interactions 164 made to any aspect of the process of generating API responses 106 compared to expected API responses 160.

In particular embodiments, the processing engine 144 may monitor the user activity and interaction data 153. In this process, the processing engine 144 may execute the one or more generative machine-learning models 168, such as one or more of a language model (LM), a large language model (LLM), one or more transformer-based machine-learning models, one or more sequence-to-sequence (Seq2Sec) models, or other similar generative machine-learning models 168. In particular embodiments, the potentially adversarial insider interactions 164 may include user interaction data captured in relation to a live natural language exchange session conducted electronically between the preauthorized user 102 and an external user. In particular embodiments, the processing engine 144 may further train the one or more generative machine-learning models 168 based on the user activity and interaction data 153.

In one embodiment, the processing engine 144 may implement a random data generator for generating combinations of content 182 and combinations of contextual data 184. The processing engine 144 may vary the content 156 and the contextual data 158 among one or more API requests 104. In the example of an API request 104 for generating a user account number for a user, to generate the combinations of content 182, the processing engine 144 may vary different data fields of the content 156, such as names, addresses, phone numbers, use account numbers, number of digits used in the user account numbers, etc. associated with the historical API requests 154. In the example of an API request 104 for generating a user account number for a user, to generate the combinations of contextual data 184, the processing engine 144 may vary different data fields of the contextual data 158, such as headers, trailers, URLs, data formats, etc. associated with the historical API requests 154.

In some cases, a data field in content 182 and/or in contextual data 158 may not be generated synthetically and/or randomly. For example, zip codes associated with addresses (in content 156) may be predefined and not generated synthetically and/or randomly. In another example, names of cities associated with addresses (in content 156) may be predefined and not generated synthetically and/or randomly. In another example, the data format in contextual data 158 may be predefined and not generated synthetically and/or randomly. In such cases, the processing engine 144 may search in the data lexicon 180 that includes data that is predefined and/or not generated synthetically and/or randomly. The processing engine 144 may fetch such data from the data lexicon 180 and use it in the various combinations of content 182 and various combinations of contextual data 184.

Generating API Requests

At the execution operation, the processing engine 144 feeds the generated combinations of content 182 and combinations of contextual data 184 to the concatenation module 186.

The concatenation module 186 may be implemented by the processor 142 executing the software instructions 152, and further is generally configured to generate the API requests 104. In this process, the concatenation module 186 may concatenate each generated content 182 with each generated contextual data 184. Each combination of generated content 182 with a generated contextual data 184 may represent one of the API requests 104. The concatenation module 186 may feed the API requests 104 to the prefetch module 188.

The prefetch module 188 may be implemented by the processor 142 executing the software instructions 152, and further is generally configured to place the API requests 104 in batches 190. Each batch 190 may include fifty, one-hundred, or any other number of API requests 104. API requests 104 in each batch 190 may be associated with a particular API service 124, e.g., generating user account numbers, etc.

The prefetch module 188 may determine whether the API requests 104 are compatible with the API services 124 of the destination second computing system 120, so that no error message is expected to be received from the second computing system 120. If the prefetch module 188 determines that the API requests 104 (in a first batch 190) are valid and compatible with the desired API service 124, the prefetch module 188 communicates the API requests 104 (in a first batch 190) to the second computing system 120.

In one embodiment, while the second computing system 120 is processing the API requests 104 (in the first batch 190), the prefetch module 188 may prefetch and prepare the next batch 190 of API requests 104 to send to the second computing system 120. The prefetch module 188 may continue this process for the next batches 190.

Generating API Responses

The second computing system 120 receives the API requests 104 at the differential privacy module 132. The differential privacy module 132 may be implemented by the processor 122 executing the software instructions 130, and further is generally configured to determine whether each of the API requests 104 is valid.

In one embodiment, the differential privacy module 132 may determine whether an API request 104 is valid by determining whether it has originated from a pre-authenticated endpoint. If the differential privacy module 132 determines that an API request 104 is valid, it sends the API request 104 to the processor 122 for processing. Otherwise, in one embodiment, the differential privacy module 132 may not forward the API request 104 to the processor 122. In another embodiment, the differential privacy module 132 may return an error message to an originator of the invalid API request 104. Thus, if the API request 104 is determined to be invalid, the second computing system 120 may not generate an API response for it.

In this manner, the computing system and network 100 of FIG. 1 may be integrated into a practical application of improving information security and data loss prevention. For example, a bad actor may attempt to gain unauthorized access to the second computing system 120 by sending an API request 104. By detecting that the API request 104 is invalid, data stored in the second computing system 120 may be kept secure from unauthorized access.

The processor 122 receives the validated API requests 104 and process them. The processor 122 generates an API response 106 for each validated API request 104. For example, if the API request 104 includes a request to generate a user account number, the API response 106 to this API request 104 includes the generated user account number. The processor 122 communicates the API responses 106 to the differential privacy module 132.

Receiving API Responses

The differential privacy module 132 communicates the API responses 106 to the prefetch module 188. The prefetch module 188 may be implemented by the processor 142 executing the software instruction 152, and further is generally configured to parse each API response 106. In one embodiment, the prefetch module 188 implemented a text parsing algorithm, such as natural language processing. In one embodiment, the prefetch module 188 may implement object-oriented programming and treat each data field in the API responses 106 as an object. The prefetch module 188 may include a content parser and a contextual data parser. The content parser may parse the contents 172 of the API responses 106. The contextual data parser may parse the contextual data 174 of the API responses 106. The prefetch module 188 forwards the content 172 and contextual data 174 to the monitoring module 194.

Securing User Data Against Internal Cyber Threats

Embodiments of the present disclosure discuss techniques for securing user data against internal cyber threats.

Figure 2:
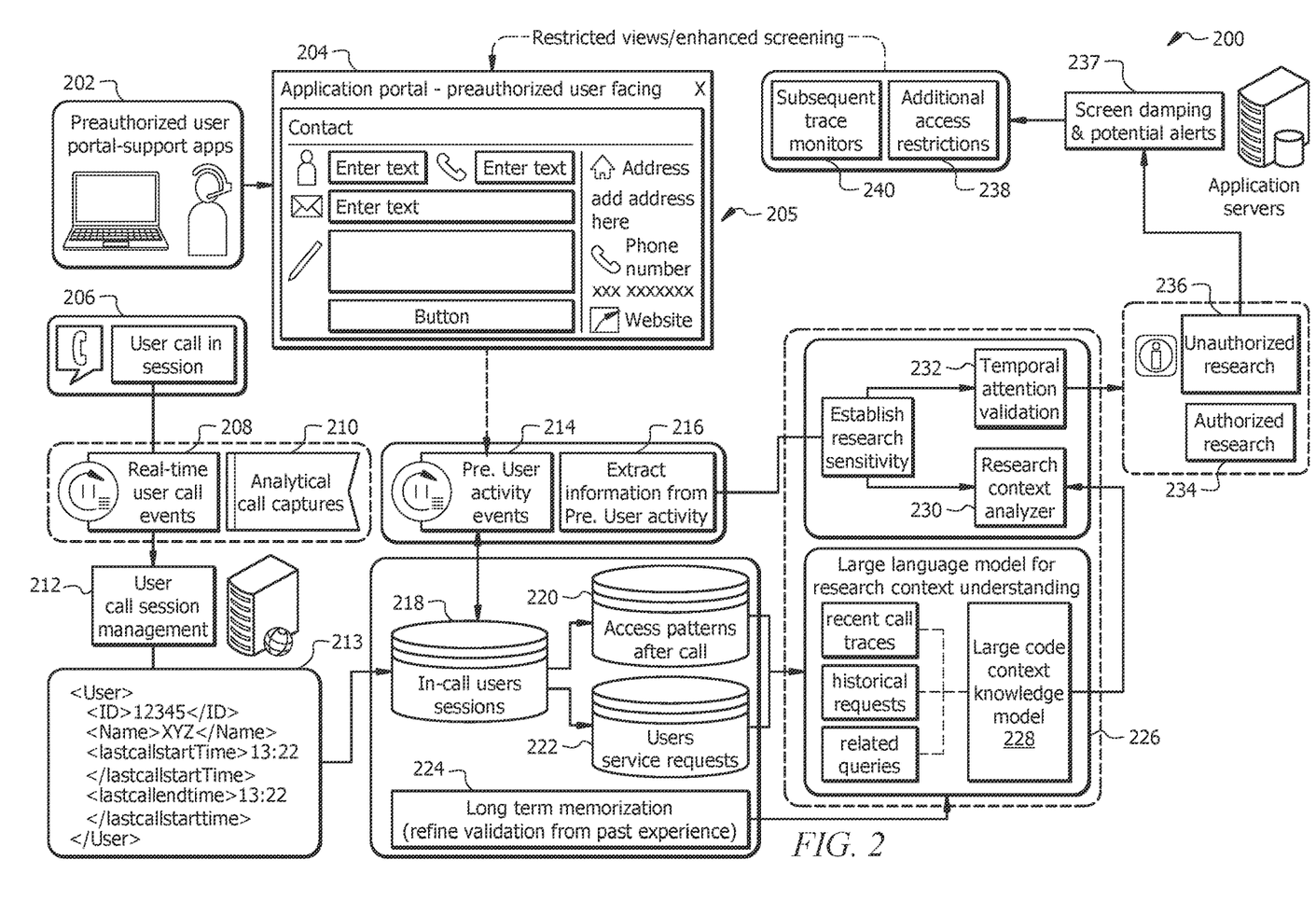
FIG. 2 illustrates a workflow diagram of an embodiment of an insider threat detection system for securing user data against internal cyber threats, in accordance with one or more embodiments of the present disclosure.

FIG. 2 illustrates a workflow diagram of an embodiment of an insider threat detection system 200 for securing user data against internal cyber threats, in accordance with certain aspects of the present disclosure. As used herein, an "insider threat" or "internal cyber threat" may refer to any cyber security risk or vulnerability that originates from within an institution, an organization, or an entity, such as the case when preauthorized users (e.g., employees, associates) or previously authorized users (e.g., temporary agents, former employees) compromise their authorized access to sensitive software applications, systems, networks, or user data, whether intentionally or unintentionally.

In particular embodiments, the workflow the workflow of the insider threat detection system 200 may be performed utilizing the first computing system 140 as described above with respect to FIG. 1. As depicted, the workflow of the insider threat detection system 200 may begin with a pre-authorized user accessing one or more preauthorized user portal support applications 202. For example, in one embodiment, the preauthorized user 102 may be an associate of an institution suitable for hosting and servicing sensitive user profile data 205 associated with a large number of respective users.

In particular embodiments, the workflow of the insider threat detection system 200 may then proceed with the preauthorized user 102 conducting, for example, a natural language exchange session 206 with an external user to which the sensitive user profile data 205 is associated. In one embodiment, the natural language exchange session 206 may include, for example, a live call, a live chat channel session, a live videoconference, an interactive voice response (IVR) session, a live voice conference, or other natural language exchange session in which a conversional exchange between the preauthorized user 102 and the external user.

In particular embodiments, the external user may convey a request to the preauthorized user 102, thus prompting the preauthorized user 102 to access the sensitive user profile data 205 utilizing the preauthorized user facing software application 204. In particular embodiments, the workflow of the insider threat detection system 200 may then continue with capturing and storing real-time or near real-time user conversation events 208 and analytical conversation captures 210. The workflow of the insider threat detection system 200 may then continue with executing a user conversation exchange management component 212 to identify and extract a set of key-value pairs 213 identifying the external user and the time and/or time to live (TTL) of the natural language exchange session 206 between the preauthorized user 102 and the external user. In particular embodiments, the workflow of the insider threat detection system 200 may then continue with storing the extracted set of key-value pairs 213 to an in-call user sessions database 218.

In particular embodiments, subsequent to, or concurrently with, the capture and storage of the natural language exchange session 206, the workflow of the insider threat detection system 200 may continue with monitoring and capturing any user interactions 214 performed by the preauthorized user 102. In particular embodiments, the workflow of the insider threat detection system 200 may continue with extracting information 216 associated with the user interactions 214 performed by the preauthorized user 102. In particular embodiments, the workflow of the insider threat detection system 200 may continue with storing the monitored and captured user interactions 214 to the in-call user sessions database 218.

In particular embodiments, the workflow of the insider threat detection system 200 may then continue with accessing the in-call user sessions database 218 and storing after-session preauthorized user interaction patterns and external user service requests as structured data to respective relational databases 220 and 222. For example, in one embodiment, the after-session preauthorized user interaction patterns and external user service requests may be stored to the respective relational databases 220 and 222 as a categorized system of records (SORs), which may be further committed to long-term memorization 224 to assist in refining validations from past experience. In particular embodiments, the workflow of the insider threat detection system 200 may then continue with inputting the after-session preauthorized user interaction patterns stored to relational database 220 and the external user service requests stored to relational database 222, as well as the categorized SORs stored to long-term memorization 224 to one or more generative machine-learning models 226.

In one embodiment, the one or more generative machine-learning models 226 may include one or more of a language model (LM) or a large language model (LLM) that may be pretrained or fine-tuned to identify an intent of the preauthorized user 102 based on the after-session preauthorized user interaction patterns stored to relational database 220 and the external user service requests stored to relational database 222, as well as the categorized SORs stored to long-term memorization 224. In another embodiment, the one or more generative machine-learning models 226 may include one or more of a bidirectional and auto-regressive transformer (BART) model, a bidirectional encoder representations for transformer (BERT) model, a knowledge enhanced bidirectional encoder representations for transformer (KnowBERT) model, a generative pre-trained transformer (GPT) model, or other similar language context based knowledge model 228 that may be suitable for identifying intent, context, and temporality of the user interactions 214 performed by the preauthorized user 102 in real-time or near real-time in accordance with the presently disclosed embodiments.

For example, as further depicted, the workflow of the insider threat detection system 200 may include the language context-based knowledge model 228 the identified intent of the user interactions 214 performed by the preauthorized user 102 to a research context analyzer 230 and temporal attention validator 232. For example, in particular embodiments, the language context-based knowledge model 228 may include a time-aware self-attention mechanism that may be pretrained or fine-tuned to "pay attention" to or weight a query Q, a key K, a value V, and a time T associated with the identified intent of the user interactions 214 performed by the preauthorized user 102.

In this way, a time condition may be associated with the user interactions 214 performed by the preauthorized user 102, such that if the user interactions 214 performed by the preauthorized user 102 fails to satisfy the time condition, the user interactions 214 performed by the preauthorized user 102 may be identified as corresponding unauthorized user interactions. For example, in one embodiment, the time condition may be a time frame of within 1 day of the natural language exchange session 206 between the preauthorized user 102 and the external user, a time frame of within 1 week of the natural language exchange session 206 between the preauthorized user 102 and the external user, a time frame of within 1 month of the natural language exchange session 206 between the preauthorized user 102 and the external user, or other institutionally-determined time frame.

Similarly, the research context analyzer 230 may include a machine-learning based context analyzer suitable for identifying and analyzing context by executing context understanding tasks, such as dialogue state tracking (DST), coreference resolution (CR), implicit discourse relation classification, query rewriting, or other similar tasks suitable for identifying and ascertaining context of the user interactions 214 performed by the preauthorized user 102. Specifically, the research context analyzer 230 may be suitable for determining whether the user interactions 214 performed by the preauthorized user 102 are in accordance with the context of the request(s) of the external user as conveyed during the natural language exchange session 206 between the preauthorized user 102 and the external user and/or in accordance with the context of the after-session preauthorized user interaction patterns and external user service requests.

In particular embodiments, the workflow of the insider threat detection system 200 may then determining whether the user interactions 214 performed by the preauthorized user 102 constitute authorized user interactions and/or authorized research 234 or unauthorized user interactions and/or unauthorized research 236. In particular embodiments, in response to determining, for example, that the user interactions 214 performed by the preauthorized user 102 constitute authorized user interactions and/or authorized research 234, the preauthorized user 102 may be allowed to continue to access the sensitive user profile data 205 utilizing the preauthorized user facing software application 204.

On the other hand, in response to determining, for example, that the user interactions 214 performed by the preauthorized user 102 constitute unauthorized user interactions and/or unauthorized research 236, the preauthorized user 102 may be restricted access to the sensitive user profile data 205 utilizing the preauthorized user facing software application 204. For example, in one embodiment, the workflow of the insider threat detection system 200 may include performing a screen damping process 237 or other additional access restrictions 238 (e.g., data obfuscation, data masking) to restrict access of the preauthorized user 102 to the sensitive user profile data 205. In one embodiment, the workflow of the insider threat detection system 200 may lastly include continuing to monitor future natural language exchange sessions 240 with respect to the preauthorized user 102.

Thus, in accordance with the presently disclosed embodiments, the insider threat detection system 200 may improve the security, reliability, and maintainability of software applications, systems, and sensitive user data, as well as the one or more processors and memory on which the software applications, systems, and sensitive user data may be executed and stored by providing an insider threat detection system that utilizes one or more generative artificial intelligence (AI) models to identify an internal user intent based on a real-time or near real-time natural language exchange between the internal user and an external user to which the sensitive user data belongs, and further to determine whether to allow or restrict further access of the internal user to the sensitive user data based on whether one or more subsequent user interactions performed by the internal user corresponds to one or more authorized and valid user interactions in accordance with the intent.

Accordingly, the present embodiments may identify, isolate, and preempt potential insider threats, insider adversarial attacks, cyberattacks, data breaches, or other security vulnerabilities that may be associated with software applications, systems, and sensitive user data. Specifically, by determining in real-time or near real-time the intent of the internal user and then monitoring the subsequent user interactions of the internal user in accordance with the determined intent to determine whether to allow or restrict further access of the internal user to sensitive user data, the present embodiments may identify in real-time or near real-time insider threats and actively reconfigure the software application, system, or sensitive user data to which the internal user previously had access to prevent a potential data leak or other systemic vulnerability with respect to the software application, system, or sensitive user data.

Figure 3:
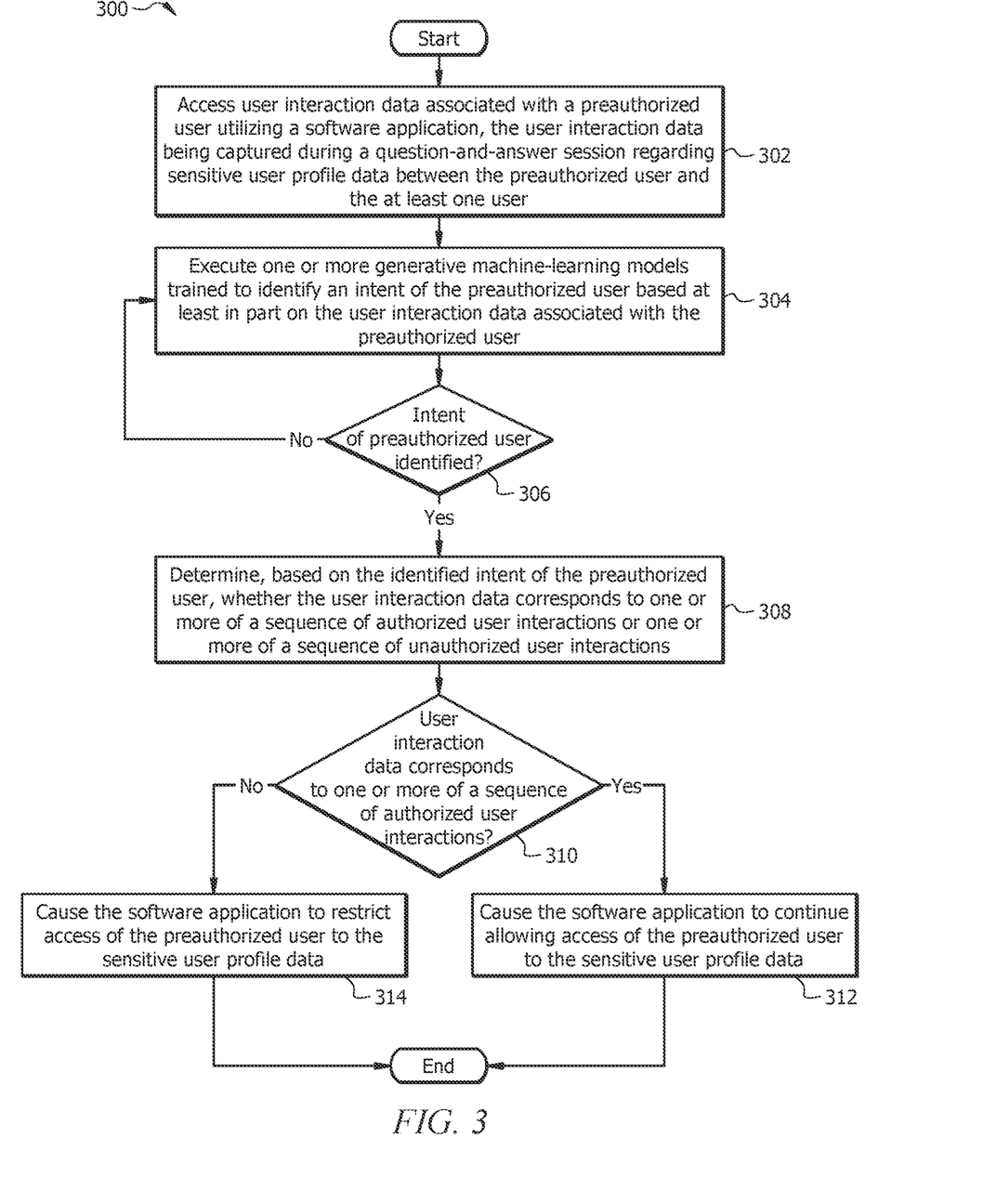
FIG. 3 illustrates a flowchart of an example method for securing user data against internal cyber threats, in accordance with one or more embodiments of the present disclosure.

FIG. 3 illustrates a flowchart of an example method 300 for securing user data against internal cyber threats, in accordance with one or more embodiments of the present disclosure. The method 300 may be performed utilizing the first computing system 140 as described above with respect to FIG. 1. The method 300 may begin at block 302 with the first computing system 140 accessing user interaction data associated with a preauthorized user utilizing a software application, in which the user interaction data is captured in relation to a natural language exchange session regarding sensitive user profile data between the preauthorized user and at least one external user of a plurality of external users.

For example, in one embodiment, the preauthorized user 102 may be preauthorized to access the sensitive user profile data 205 utilizing the preauthorized user facing software application 204. Specifically, in particular embodiments, the preauthorized user 102 and the external user may conduct a live call, a live chat channel session, a live videoconference, an interactive voice response (IVR) session, a live voice conference, or other natural language exchange session in which the external user may convey a request, which prompts the preauthorized user 102 to access the sensitive user profile data 205 utilizing the preauthorized user facing software application 204.

The method 300 may then continue at block 304 with the first computing system 140 executing one or more generative machine-learning models trained to identify an intent of the preauthorized user based at least in part on the user interaction data associated with the preauthorized user. For example, in response to receiving a request from the external user prompting the preauthorized user 102 to access the sensitive user profile data 205 utilizing the software application 204, the preauthorized user 102 may then perform one or more user interactions utilizing the software application 204. In particular embodiments, the first computing system 140 may then execute the one or more generative machine-learning models 168 pretrained or fine-tuned to identify an intent of the preauthorized user 102 based on the one or more user interactions performed by the preauthorized user 102 utilizing the software application 204.

The method 300 may then continue at decision 306 with the first computing system 140 determining whether the intent of the preauthorized user 102 based on the one or more user interactions performed by the preauthorized user 102 has been identified. For example, in response to determining that the intent of the preauthorized user 102 based on the one or more user interactions performed by the preauthorized user 102 has not been identified, the method 300 may return to block 304 as discussed above. In response to determining that the intent of the preauthorized user 102 based on the one or more user interactions performed by the preauthorized user 102 has been identified, the method 300 may then continue at block 308 with the first computing system 140 determining, based on the identified intent of the preauthorized user, whether the user interaction data corresponds to one or more of a sequence of authorized user interactions or one or more of a sequence of unauthorized user interactions.

For example, in particular embodiments, the one or more generative machine-learning models 168 may be further pretrained or fine-tuned to classify one or more search queries or research activities performed by the preauthorized user 102 as corresponding to one or more of a sequence of authorized user interactions or one or more of a sequence of unauthorized user interactions based on whether the one or more search queries or research activities are performed in accordance with a determined context and temporal attention associated with the request provided by the external user. The method 300 may then continue at decision 310 with the first computing system 140 confirming whether the user interaction data corresponds to one or more of the sequences of authorized user interactions or one or more of the sequences of unauthorized user interactions.

In particular embodiments, in response to the first computing system 140 confirming that the user interaction data corresponds to one or more of the sequences of authorized user interactions, the method 300 may then continue at block 312 with the first computing system 140 causing the software application to continue allowing access of the preauthorized user to the sensitive user profile data. For example, in response to confirming that the user interactions performed by the preauthorized user 102 data corresponds to authorized and valid user interactions, the software application 204 may continue to display the sensitive user profile data 205 and continue to allow the preauthorized user 102 to research and interact with the sensitive user profile data 205.

Other hand, in response to the first computing system 140 confirming that the user interaction data corresponds to one or more of the sequences of unauthorized user interactions, the method 300 may then continue at block 314 with the first computing system 140 causing the software application to restrict access of the preauthorized user to the sensitive user profile data. For example, in response to confirming that the user interactions performed by the preauthorized user 102 data corresponds to unauthorized and invalid user interactions, the software application 204 may forgo displaying the sensitive user profile data 205 and restrict any further access to the sensitive user profile data 205 by the preauthorized user 102. In one embodiment, the software application 204 may mask the sensitive user profile data 205 or perform one or more other data obfuscation processes suitable for preventing or reducing further access to the sensitive user profile data 205 by the preauthorized user 102.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
a memory configured to store user profile data associated with at least one user of a plurality of users, user interaction data associated with a preauthorized user, and a software application configured to access the user profile data, wherein the preauthorized user is preauthorized to access the user profile data utilizing the software application; and
one or more processors operably coupled to the memory and configured to:
access the user interaction data associated with the preauthorized user, wherein the user interaction data is captured in relation to a natural language exchange session regarding the user profile data, the natural language exchange session conducted electronically between the preauthorized user and the at least one user;
execute one or more generative machine-learning models trained to identify an intent of the preauthorized user based at least in part on the user interaction data associated with the preauthorized user;
determine, based on the identified intent of the preauthorized user, whether the user interaction data corresponds to one or more of a sequence of authorized user interactions or one or more of a sequence of unauthorized user interactions; and
in response to determining that the user interaction data corresponds to one or more of the sequences of unauthorized user interactions, cause the software application to restrict further access of the preauthorized user to the user profile data.

2. The system of claim 1, wherein the user interaction data is captured in relation to a live natural language exchange session conducted electronically between the preauthorized user and the at least one user.

3. The system of claim 1, wherein the one or more processors are configured to execute the one or more generative machine-learning models further trained to identify the intent of the preauthorized user based at least in part on a data set of recent user calls, a data set of historical user requests, and one or more unresolved user queries associated with the user profile data.

4. The system of claim 1, wherein the one or more processors are configured to execute the one or more generative machine-learning models further trained to identify the intent of the preauthorized user by determining whether the user interaction data corresponds to one or more predicted search queries executed in accordance with the natural language exchange session.

5. The system of claim 1, wherein the one or more processors are further configured to determine that the user interaction data corresponds to one or more of the sequences of authorized user interactions based on an identified context associated with the natural language exchange session.

6. The system of claim 1, wherein the one or more processors are further configured to determine that the user interaction data corresponds to one or more of the sequences of authorized user interactions based on an identified temporal attention associated with the natural language exchange session.

7. The system of claim 1, wherein the one or more generative machine-learning model comprises one or more of a language model (LM), a large language model (LLM), a bidirectional and auto-regressive transformer (BART) model, a bidirectional encoder representation for transformer (BERT) model, a knowledge enhanced bidirectional encoder representations for transformer (KnowBERT) model, or a generative pre-trained transformer (GPT) model.

8. A method, comprising:
accessing user interaction data associated with a preauthorized user, wherein the user interaction data is captured in relation to a natural language exchange session regarding user profile data associated with at least one user of a plurality of users, wherein the natural language exchange session is conducted electronically between the preauthorized user and the at least one user, and wherein the preauthorized user is preauthorized to access the user profile data utilizing a software application;
executing one or more generative machine-learning models trained to identify an intent of the preauthorized user based at least in part on the user interaction data associated with the preauthorized user;
determining, based on the identified intent of the preauthorized user, whether the user interaction data corresponds to one or more of a sequence of authorized user interactions or one or more of a sequence of unauthorized user interactions; and
in response to determining that the user interaction data corresponds to one or more of the sequences of unauthorized user interactions, causing the software application to restrict further access of the preauthorized user to the user profile data.

9. The method of claim 8, wherein the user interaction data is captured in relation to a live natural language exchange session conducted electronically between the preauthorized user and the at least one user.

10. The method of claim 8, further comprising executing the one or more generative machine-learning models further trained to identify the intent of the preauthorized user based at least in part on a data set of recent user calls, a data set of historical user requests, and one or more unresolved user queries associated with the user profile data.

11. The method of claim 8, further comprising executing the one or more generative machine-learning models further trained to identify the intent of the preauthorized user by determining whether the user interaction data corresponds to one or more predicted search queries executed in accordance with the natural language exchange session.

12. The method of claim 8, further comprising determining that the user interaction data corresponds to one or more of the sequences of authorized user interactions based on an identified context associated with the natural language exchange session.

13. The method of claim 8, further comprising determining that the user interaction data corresponds to one or more of the sequences of authorized user interactions based on an identified temporal attention associated with the natural language exchange session.

14. The method of claim 8, wherein the one or more generative machine-learning model comprises one or more of a language model (LM), a large language model (LLM), a bidirectional and auto-regressive transformer (BART) model, a bidirectional encoder representation for transformer (BERT) model, a knowledge enhanced bidirectional encoder representations for transformer (KnowBERT) model, or a generative pre-trained transformer (GPT) model.

15. A non-transitory computer-readable medium storing instructions that, when executed by one or more processors, cause the one or more processors to:
    access user interaction data associated with a preauthorized user, wherein the user interaction data is captured in relation to a natural language exchange session regarding user profile data associated with at least one user of a plurality of users, wherein the natural language exchange session is conducted electronically between the preauthorized user and the at least one user, and wherein the preauthorized user is preauthorized to access the user profile data utilizing a software application;
    execute one or more generative machine-learning models trained to identify an intent of the preauthorized user based at least in part on the user interaction data associated with the preauthorized user;
    determine, based on the identified intent of the preauthorized user, whether the user interaction data corresponds to one or more of a sequence of authorized user interactions or one or more of a sequence of unauthorized user interactions; and
    in response to determining that the user interaction data corresponds to one or more of the sequences of unauthorized user interactions, cause the software application to restrict further access of the preauthorized user to the user profile data.

16. The non-transitory computer-readable medium of claim 15, wherein the user interaction data is captured in relation to a live natural language exchange session conducted electronically between the preauthorized user and the at least one user.

17. The non-transitory computer-readable medium of claim 15, wherein the instructions cause the one or more processors to execute the one or more generative machine-learning models further trained to identify the intent of the preauthorized user based at least in part on a data set of recent user calls, a data set of historical user requests, and one or more unresolved user queries associated with the user profile data.

18. The non-transitory computer-readable medium of claim 15, wherein the instructions cause the one or more processors to execute the one or more generative machine-learning models further trained to identify the intent of the preauthorized user by determining whether the user interaction data corresponds to one or more predicted search queries executed in accordance with the natural language exchange session.

19. The non-transitory computer-readable medium of claim 15, wherein the instructions further cause the one or more processors to determine that the user interaction data corresponds to one or more of the sequences of authorized user interactions based on an identified context associated with the natural language exchange session.

20. The non-transitory computer-readable medium of claim 15, wherein the instructions further cause the one or more processors to determine that the user interaction data corresponds to one or more of the sequences of authorized user interactions based on an identified temporal attention associated with the natural language exchange session.

* * * * *